(12) United States Patent
Wei et al.

(10) Patent No.: US 12,174,075 B1
(45) Date of Patent: Dec. 24, 2024

(54) TEMPERATURE MEASUREMENT DEVICE

(71) Applicant: Finemold Technologies Co., Ltd, Guangdong (CN)

(72) Inventors: XiangChun Wei, Shenzhen (CN); Baohong Wang, Shenzhen (CN)

(73) Assignee: Finemold Technologies Co., Ltd, Shenzhen (CN)

( * ) Notice: Subject to any disclaimer, the term of this patent is extended or adjusted under 35 U.S.C. 154(b) by 0 days.

(21) Appl. No.: 18/799,127

(22) Filed: Aug. 9, 2024

(51) Int. Cl.
  *G01K 1/08* (2021.01)
  *G01K 1/024* (2021.01)

(52) U.S. Cl.
  CPC .............. *G01K 1/08* (2013.01); *G01K 1/024* (2013.01); *G01K 2207/02* (2013.01); *G01K 2215/00* (2013.01)

(58) Field of Classification Search
  CPC ........ A47J 2202/00; A47J 36/32; G01K 1/00; G01K 2207/02; G01K 2215/00; G01K 1/024; G01K 1/12; H02J 7/0042
  See application file for complete search history.

(56) References Cited

U.S. PATENT DOCUMENTS

| 11,644,366 | B1 * | 5/2023 | Chen ...................... G01K 1/026 374/166 |
| 11,982,578 | B2 * | 5/2024 | Huang ..................... G01K 7/18 |
| 2016/0377490 | A1 * | 12/2016 | Nivala ..................... G01K 7/42 374/155 |
| 2021/0231503 | A1 * | 7/2021 | Wu ......................... G01K 1/024 |

* cited by examiner

*Primary Examiner* — Gail Kaplan Verbitsky

(57) ABSTRACT

The temperature measurement device provided in the present disclosure includes: a first housing; a second housing having a tip for insertion into food; an insulated connection part connected to the first housing and the second housing separately; a handle connected to the first housing; and a circuit board unit at least located inside the first housing and the second housing, wherein the circuit board unit is connected to a food temperature sensing unit, a battery unit, and an antenna unit; wherein, the first housing and the second housing respectively act as a first electrode unit and a second electrode unit of the temperature measurement device, and the first electrode unit and the second electrode unit are used to charge the battery unit.

19 Claims, 8 Drawing Sheets

TEMPERATURE MEASUREMENT DEVICE

CROSS-REFERENCE TO RELATED APPLICATIONS

The application claims the priority of a Chinese patent application CN 2024110245314 with a filing date on Jul. 29, 2024, and its entire content is incorporated by reference into the application.

FIELD

The present disclosure relates to the field of temperature measurement, and more specifically, to a temperature measurement device.

BACKGROUND

During the high-temperature baking process, the temperature measurement device plays an important role in controlling the baking temperature and heat of food. Due to the small size of temperature measurement device, the traditional temperature measurement devices have problems such as poor high-temperature resistance, low integration, and difficulty in use.

The temperature measurement device of the present disclosure does not require foolproof design in the structure, and has high integration and good high-temperature resistance performance. For example, the housing of traditional temperature measurement devices only serves to protect the temperature measurement device, while the housing of the temperature measurement device in the present disclosure can be divided into at least two parts and these two parts can respectively act as positive and negative electrodes for charging the battery unit of the temperature measurement device. In addition, due to the high temperature environment in which temperature measurement devices are typically used, the traditional circuit boards are unable to withstand high temperatures, which limits the actual use range of the temperature measurement devices. A heat dissipation channel is created in the present disclosure by connecting the first elastic contact unit and the second elastic contact unit which are connected to the positive and negative poles of the temperature measurement device, with two parts of the housing. The heat from the part of the housing exposed to high temperature air is transferred to another part of the housing inserted into food (such as meat), thereby reducing the temperature of the part of the housing exposed to high temperature air and protecting the circuit board part therein. When the temperature measurement device is inserted into food, the food acts as a thermal isolation to protect the part of the temperature measurement device inserted into the food.

SUMMARY

The temperature measurement device proposed in the present disclosure solves the problems of poor high-temperature resistance and single function of traditional temperature measurement devices.

In view of the above and other ideas, the present disclosure is proposed.

According to one aspect of the present application, there is provided a temperature measurement device comprising:
a first housing;
a second housing having a tip for insertion into food;
an insulated connection part connected to the first housing and the second housing separately;
a handle connected to the first housing; and
a circuit board unit at least located inside the first housing and the second housing, wherein the circuit board unit is connected to a food temperature sensing unit, a battery unit, and an antenna unit;
wherein, the first housing and the second housing respectively act as a first electrode unit and a second electrode unit of the temperature measurement device, and the first electrode unit and the second electrode unit are used to charge the battery unit.

In one embodiment, the insulated connection part comprises:
a proximal connection end;
a distal connection end opposite to the proximal connection end; and
a middle protrusion;
the proximal connection end is connected to the second housing, and the distal connection end is connected to the first housing, when the first housing and the second housing are connected to the insulated connection part, the middle protrusion acts as a limiting structure for the first housing and the second housing and separates the first housing and the second housing.

In one embodiment, when the first housing and the second housing are connected to the insulated connection part, the middle protrusion serves as a warning line for the temperature measurement device, the part of the warning line to the tip is inserted into the food, and the part of the warning line to the handle is exposed to air.

In one embodiment, the proximal connection end comprises a fixing groove for fixing the circuit board unit.

In one embodiment, the insulated connection part comprises a first channel for the circuit board unit to pass through.

In one embodiment, the circuit board unit comprises a first elastic contact unit in contact with an inner wall of the first housing, and a second elastic contact unit in contact with an inner wall of the second housing, wherein the first elastic contact unit extends from the circuit board unit to the first housing, and the second elastic contact unit extends from the circuit board unit to the second housing, and the first electrode unit and the second electrode unit are respectively connected to the battery unit through the first elastic contact unit and the second elastic contact unit.

In one embodiment, the insulated connection part comprises a second channel separated from the first channel, wherein the second channel is used to fix the first elastic contact unit.

In one embodiment, the first elastic contact unit comprises an elastic body connected to the circuit board unit and a contact end in contact with the inner wall of the first housing, and the elastic body extends from the portion of the circuit board unit located inside the second housing to the inner wall of the first housing.

In one embodiment, the second elastic contact unit is located in the portion of the circuit board unit located inside the second housing.

In one embodiment, the first housing, the first elastic contact unit, the second elastic contact unit, and the second housing constitute a heat dissipation channel of the temperature measurement device, wherein the second elastic contact unit is adjacent to the elastic body, and when the temperature measurement device is used, the second housing is inserted into food, the first housing is exposed to air, the first elastic contact unit transfers the heat of the first housing to the part of the circuit board unit inside the second housing, and the second elastic contact unit transfers the heat to the second housing.

In one embodiment, the second elastic contact unit comprises multiple elastic contacts arranged on both sides of the circuit board unit, and the elastic contacts are in contact with the inner wall of the second housing.

In one embodiment, the proximal connection end and the distal connection end are respectively provided with grooves, and the grooves are provided with sealing members, when the proximal connection end and the distal connection end are respectively connected to the first housing and the second housing, the sealing members respectively abut against the inner walls of the first housing and the second housing.

In one embodiment, one part of the elastic body is located in the second channel.

In one embodiment, a first connection part is provided at one end of the handle near the first housing, and the first connection part is used to connect to the first housing.

In one embodiment, a groove is provided on the outer periphery of the first connection part, and the groove is provided with a sealing member, when the first connection part is connected to the first housing, the sealing member contacts the inner wall of the first housing.

In one embodiment, the handle is provided with a hollow channel, and the circuit board unit extends into the hollow channel.

In one embodiment, one part of the antenna unit is located in the hollow channel.

In one embodiment, the circuit board unit is connected to an environment temperature sensing unit.

In one embodiment, the environmental temperature sensing unit is located within the hollow channel.

In one embodiment, the food temperature sensing unit and the battery unit are arranged at the tip, and the food temperature sensing unit extends from the circuit board unit to the inner wall of the tip.

According to another aspect of the present application, there is provided a temperature measurement device comprising:
- a housing comprising a first housing and a second housing having a tip for insertion into food;
- an insulated connection part connected to the first housing and the second housing separately;
- a handle connected to the first housing; and
- a circuit board unit at least located inside the first housing and the second housing, wherein the circuit board unit is connected to a food temperature sensing unit, a battery unit, and an antenna unit;
- wherein, the first housing and the second housing respectively act as a first electrode unit and a second electrode unit of the temperature measurement device, and the first electrode unit and the second electrode unit are used to charge the battery unit.

In one embodiment, the food temperature sensing unit serves as a reference temperature sensing unit for calibrating the environment temperature sensing unit, and the environment temperature sensing unit is calibrated based on a reference value of the reference temperature sensing unit.

More embodiments of the present application can also achieve other advantageous technical effects not listed one by one, which may be partially described in the following text and can be expected and understood by those skilled in the art after reading the present application.

BRIEF DESCRIPTION OF THE DRAWINGS

In order to provide a clearer explanation of the technical solution in the embodiments of the present application, a brief introduction will be given below to the accompanying drawings required in the embodiments or prior art descriptions. It is evident that the accompanying drawings in the following description are only some embodiments of the present application. For those skilled in the art, other accompanying drawings can be obtained based on these drawings without the need for creative labor.

DETAILED DESCRIPTION

Figure 1:
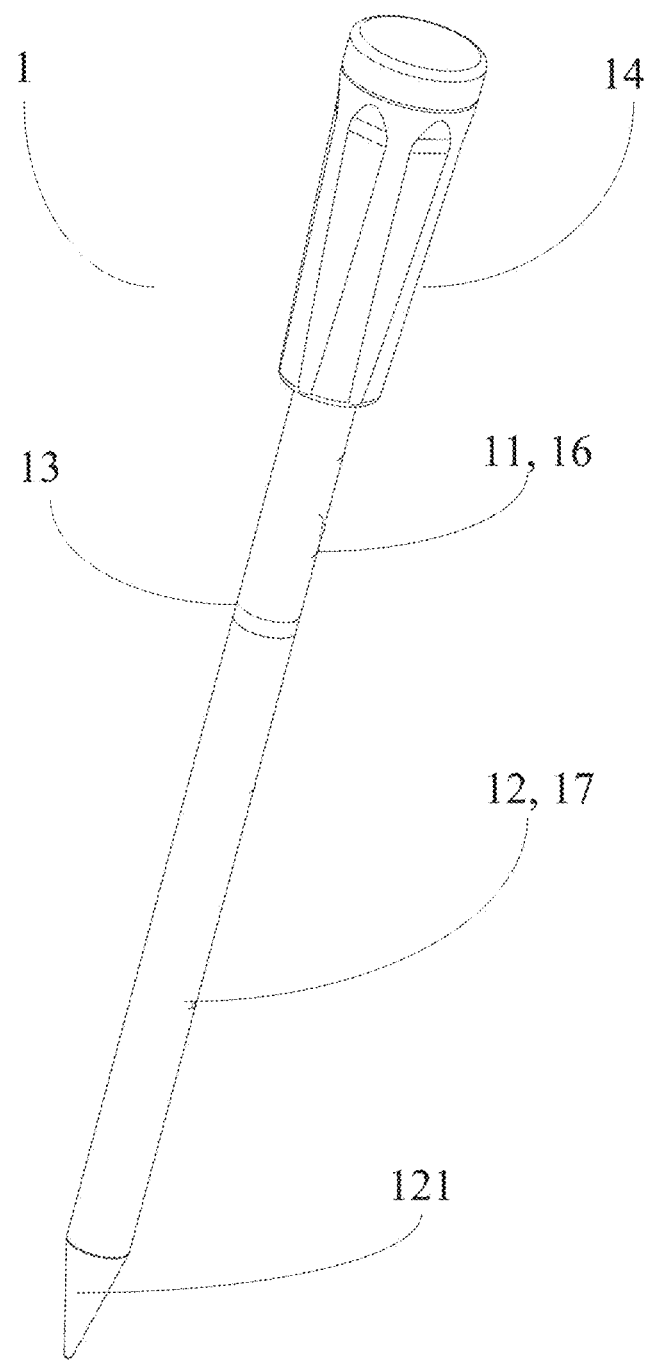
FIG. 1 shows a perspective view of the temperature measurement device of the present application.

In the following description of the accompanying drawings and specific embodiments, details of one or more embodiments of the present application will be elaborated. From these descriptions, drawings, and claims, other features, purposes, and advantages of the present application can be clearly identified.

It should be understood that the illustrated and described embodiments are not limited to the details of the construction and arrangement of the components illustrated in the following description or in the accompanying drawings in the application. The illustrated embodiments can be other embodiments and can be implemented or executed in various ways. Each example is provided by explaining the disclosed embodiments rather than limiting them. In fact, it will be apparent to those skilled in the art that various modifications and variations may be made to the embodiments of the present application without departing from the scope or substance disclosed herein. For example, features illustrated or described as part of one embodiment may be used in conjunction with another embodiment to still generate another embodiment. Therefore, the present application publicly covers such modifications and variations within the scope of the attached claims and their equivalent elements.

It should be understood that the terms "up", "down", "front", "back", "left", "right", "horizontal", etc. indicate the orientation or position relationship based on the orientation or position relationship shown in the drawings, only for the convenience of describing and simplifying the description of the present application, rather than indicating or implying that the device or component referred to must have a specific orientation, be constructed and operated in a specific orientation, and therefore cannot be understood as a limitation of the present application.

Similarly, it can be understood that the phrases and language used in the present application are for descriptive purposes and should not be considered restrictive. The use of "including", "including" or "having" and their variants in this application is intended to openly include the items listed below, their equivalents, and additional items.

As used in this application, the terms "first", "second", etc. are only used to describe the purpose and cannot be understood as indicating or implying relative importance or implying the quantity of technical features indicated. Therefore, the features limited to "first", "second", etc. may explicitly or implicitly include one or more of these features. In this application, "multiple" means two or more, unless otherwise specified.

As used in this application, the terms "installation", "connection", "connection", "fixed" and other terms should be broadly understood, for example, they can be fixed connections, detachable connections, or integrated connections; It can be a mechanical connection or an electrical connection; It can be directly connected, or indirectly connected through an intermediate medium, or it can be an internal connection between two components. For ordinary technical personnel in this field, the specific meanings of the above terms in this application can be understood based on specific circumstances.

As used in this application, "high temperature" refers to temperatures above 100° C., with a preferred range of 200-500° C.

The following will provide a more detailed description of the present application with reference to specific embodiments.

Figure 2:
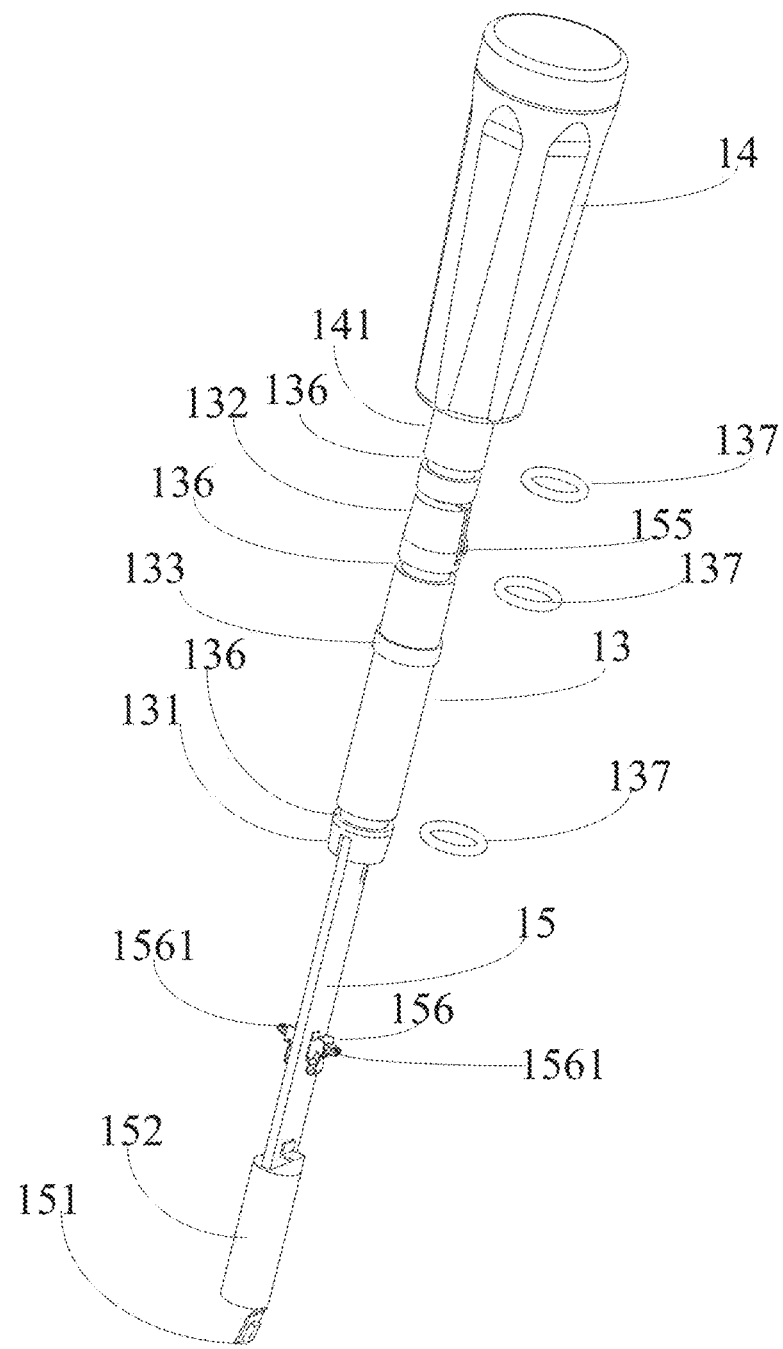
FIG. 2 shows the internal structure of the temperature measurement device of the present application.
Figure 7:
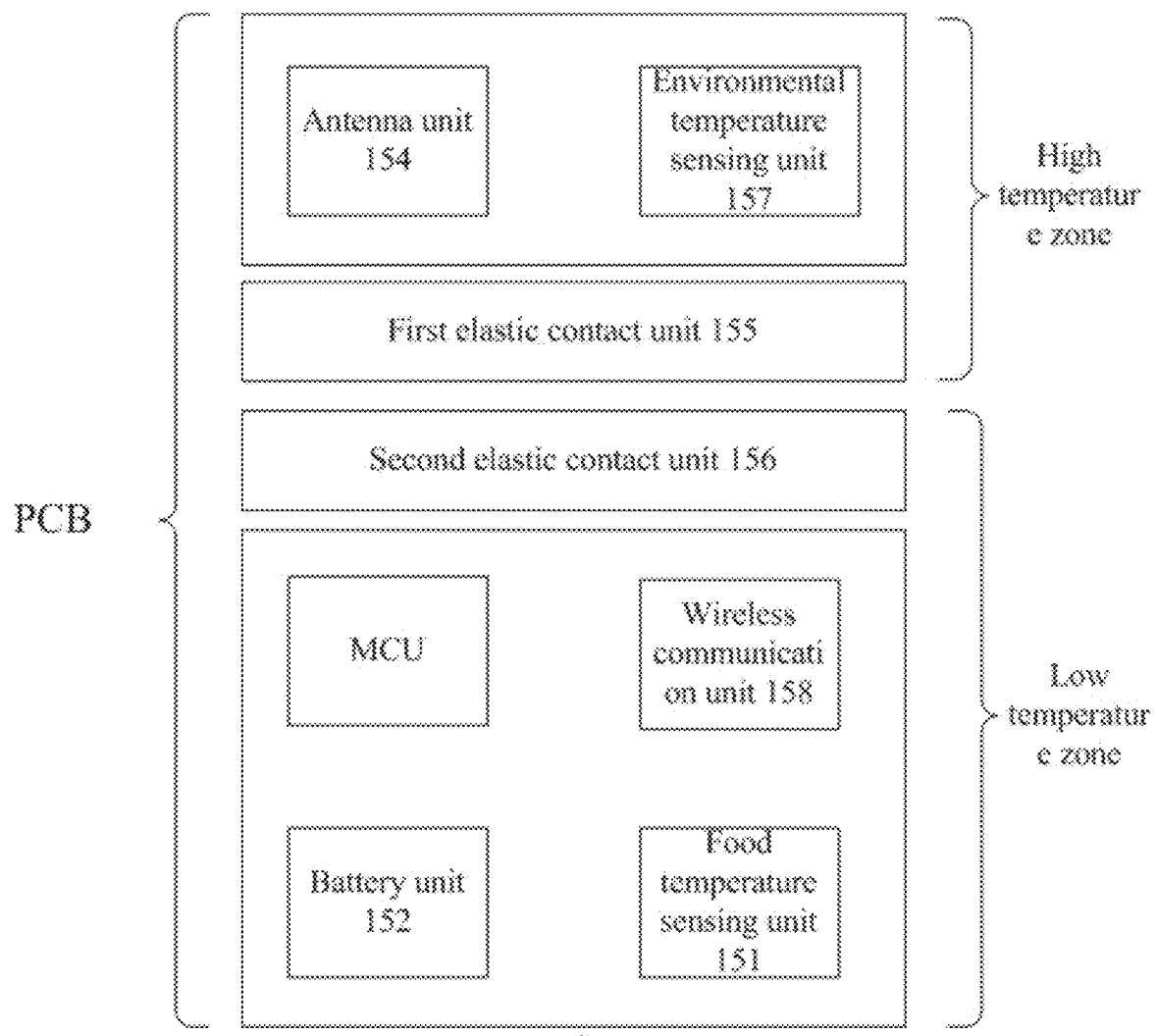
FIG. 7 shows a schematic diagram of each unit of the circuit board unit of the temperature measurement device of the present application.

FIGS. 1 and 2 show a temperature measurement device 1, which is elongated and can be used to measure the temperature during high-temperature processing of food. The temperature measurement device 1 includes a housing, a handle 14 connected to the housing, and a circuit board or printed circuit board (PCB) unit 15 located inside the housing. The circuit board unit 15 is connected to a food temperature sensing unit 151, a battery unit 152, and an antenna unit 154 (as shown in FIG. 7). The housing can be made of metal material and has a tip for inserting into food. Since metal material is a good conductor of heat, the metal material used as the tip is beneficial for rapid heat transfer to the food temperature sensing unit 151. One end of the housing is equipped with a tip 121 to facilitate the insertion of temperature measurement device 1 into food. The food temperature sensing unit 151 is electrically connected to the circuit board unit 15 and extends to the inner wall of the housing. The food temperature sensing unit 151 includes an elastic arm connected to the circuit board unit 15 and a sensor connected to the elastic arm. The sensor is located near the inner wall of the housing, preferably in close proximity to the inner wall of the housing.

One part or the whole of the circuit board unit 15 can be coated with a heat-resistance coating or material to prevent it from high temperature air.

As shown in FIG. 1, the housing includes: a first housing 11; a second housing 12 having a tip 121 for inserting into food; an insulated connection part 13 connected to the first housing 11 and the second housing 12 respectively. The insulated connection part 13 is mainly composed of insulation materials, such as ceramic materials or high temperature resistant polymer materials, so that when the insulated connection part 13 is connected to the first housing 11 and the second housing 12, the first housing 11 and the second housing 12 are insulated. Handle 14 is connected to the first housing 11 and can be made of high-temperature resistant plastic or ceramic.

Figure 3:
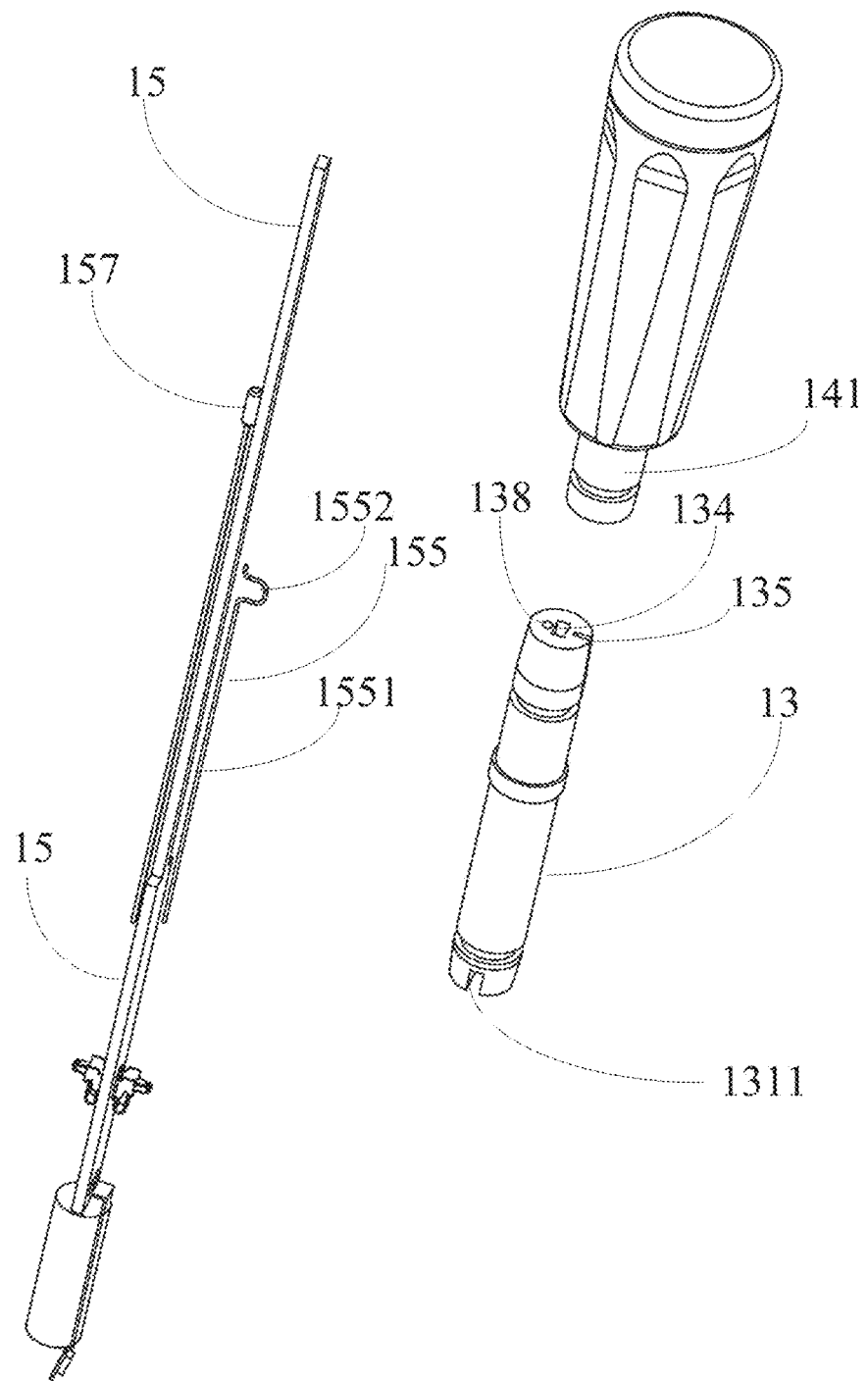
FIG. 3 shows an internal exploded view of the temperature measurement device of the present application.

As shown in FIG. 1-3, in one embodiment, the circuit board unit 15 can be located within the first housing 11, the second housing 12, and the insulated connection part 13. Therefore, the circuit board unit 15 can be divided into at least three sections, with the first section located within the first housing 11, the second section located within the insulated connection part 13, and the third section located within the second housing 12. A first housing 11 and the second housing 12 can respectively act as the first electrode unit 16 and the second electrode unit 17 of the temperature measurement device, which are used to charge the battery unit 152.

As shown in FIG. 1-3, in another embodiment, the circuit board unit 15 can be divided into four sections. The first section is located inside the first housing 11, the second section is located inside the insulated connection part 13, the third section is located inside the second housing 12, and the fourth section is located inside the handle 14. The antenna unit 154 of the circuit board unit 15 is installed inside the first housing 11 and/or handle 14. Placing antenna unit 154 inside the first housing 11 and/or handle 14 facilitates the transmission of signals by antenna unit 14.

As shown in FIG. 2-3, the circuit board unit 15 is an integral whole, alternatively the circuit board unit 15 can also be divided into several detachable connected parts. One part of the circuit board unit 15 is located inside the second housing 12, and another part is located inside the first housing 11. As shown in FIG. 7, when using a temperature measurement device, the second housing 12 and its tip 121 are inserted into food such as meat. Due to the insulation effect of meat, the second housing 12 is in a low temperature zone, while the first housing 11 is exposed to air and in the high temperature zone. The conventional circuit board unit 15 cannot withstand high temperatures. Placing the circuit board unit 15 inside the second housing 12 is beneficial for protecting the circuit board unit 15 from high temperatures, but it will affect the signal transmission of the antenna unit 154 on the circuit board unit 15. Therefore, in order to ensure good signal of antenna unit 154 of circuit board unit 15, it is necessary to place antenna unit 154 of circuit board unit 15 inside the first housing 11 and/or handle 14. Placing antenna unit 154 inside the first housing 11 and/or handle 14 facilitates the transmission of signals emitted by antenna unit 154 from handle 14. Preferably, one part of the circuit board unit 15 which has the antenna unit 154 is coated with a heat-resistance coating or material to prevent it from high temperature air. The heat-resistance coating or material will help the circuit board unit 15 withstand high temperature air, such as the air which is higher than 500° C.

Figure 4:
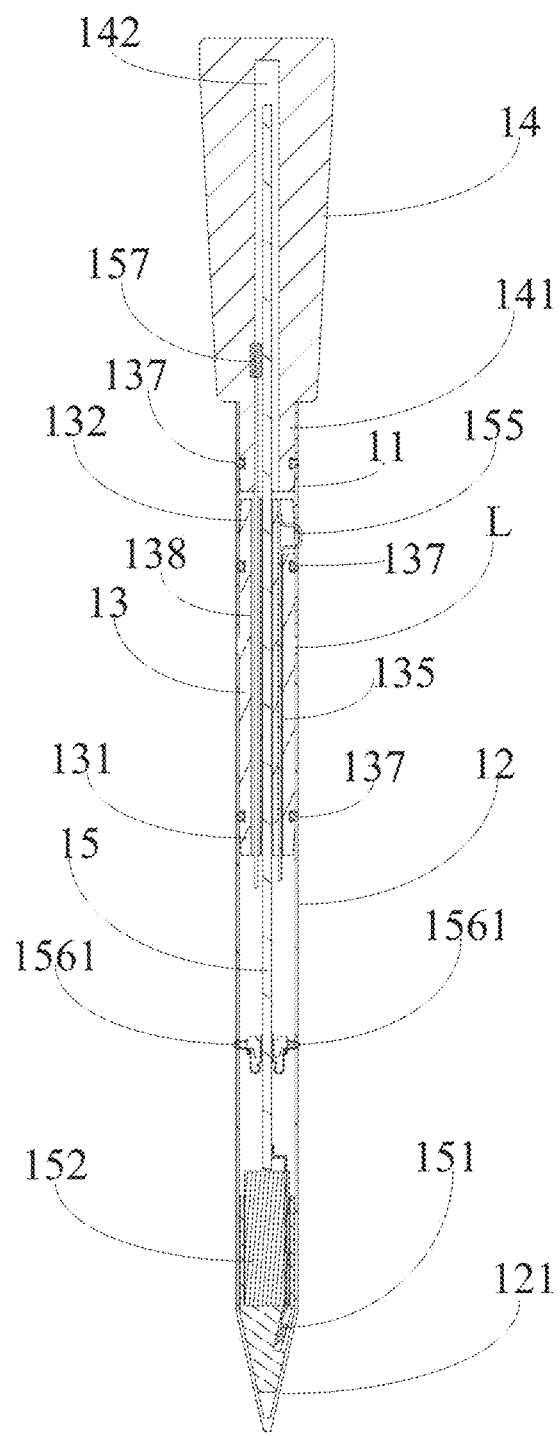
FIG. 4 shows a cross-sectional view of the temperature measurement device of the present application.
Figure 5:
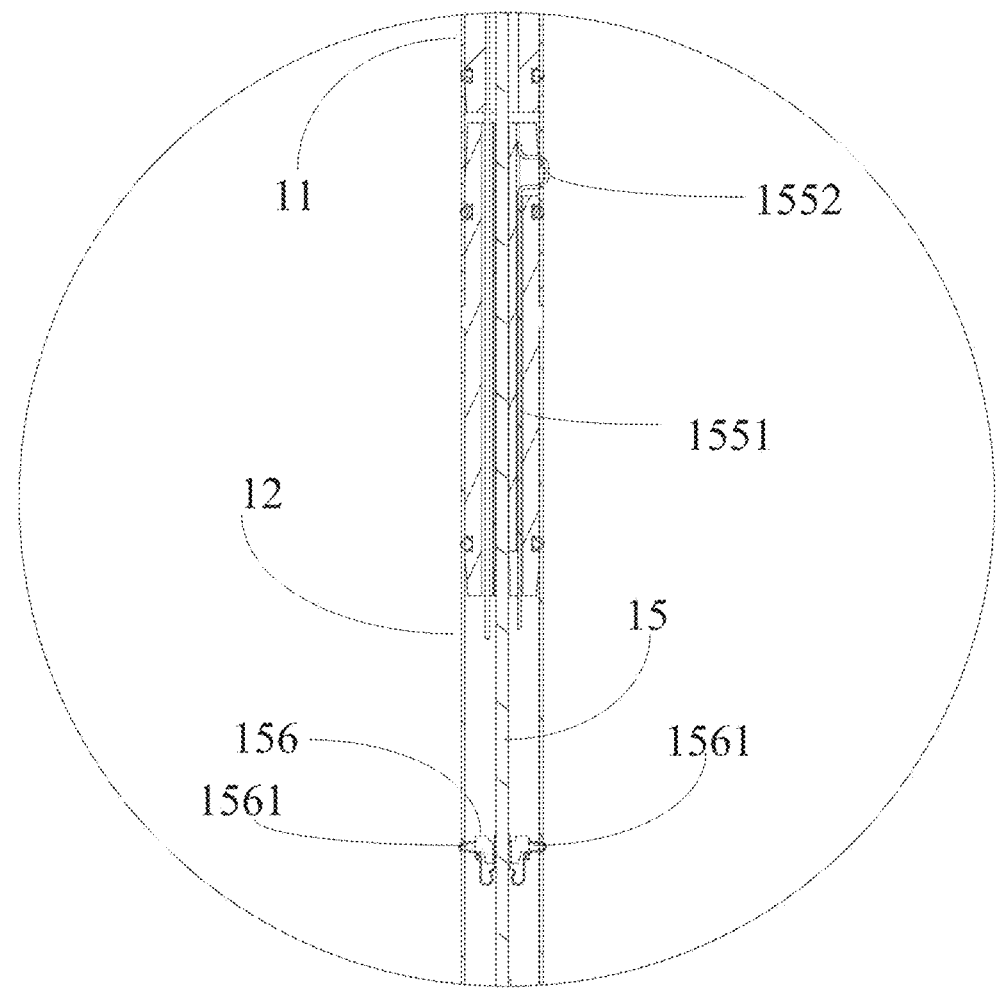
FIG. 5 shows an enlarged cross-sectional view of the temperature measurement device shown in FIG. 4.

As shown in FIG. 2-4, the insulated connection part 13 includes a proximal connection end 131; a distal connection end 132 opposite to the proximal connection end 131; and a middle protrusion 133. The proximal connection end 131 is connected to one end of the second housing 12, and the distal connection end 132 is connected to one end of the first housing 11, when the first housing 11 and the second housing 12 are connected to the insulated connection part 13, the middle protrusion 133 acts as a limiting structure for the first housing 11 and the second housing 12 and separates the first housing 11 and the second housing 12, so that when the insulated connection part 13 is connected to the first housing 11 and the second housing 12, the first housing 11 and the second housing 12 are insulated. When the first housing 11 and the second housing 12 are connected to the insulated connection part 13, the middle protrusion 133 can also act as a warning line (or indicator line) L for the temperature measurement device. The part of the warning line L from the tip 121 is inserted into the food, and the part of the warning line L from the handle 14 is exposed to the high temperature air.

As shown in FIG. 3, the proximal connection end 131 includes a fixing groove 1311 for fixing the circuit board unit 15. As shown in FIG. 3, the insulated connection part 13 may also include a first channel 134 for the circuit board unit 15 to pass through. The setting of the fixing groove 1311 and the first channel 134 is beneficial for the fixation of circuit board unit 15.

As shown in FIG. 2-4, the circuit board unit 15 includes a first elastic contact unit 155 in contact with an inner wall of the first housing 11, and a second elastic contact unit 156 in contact with an inner wall of the second housing 12. The first elastic contact unit 155 extends from the circuit board unit 15 to an inner wall of the first housing 11, and the second elastic contact unit 156 extends from the circuit board unit 15 to an inner wall of the second housing 12. The first electrode unit 16 and the second electrode unit 17 are electrically connected to the battery unit 152 through the first elastic contact unit 155 and the second elastic contact unit 156, respectively. Specifically, the first elastic contact unit 155 includes an elastic body 1551 connected to the circuit board unit 15 and a contact end 1552 in contact with an inner wall of the first housing 11. The elastic body 1551 extends from the portion of the circuit board unit 15 located inside the second housing 12 to an inner wall of the first housing 11. The second elastic contact unit 156 is located in the portion of the circuit board unit 15 within the second housing 12. The first housing 11, the first elastic contact unit 155, the second elastic contact unit 156, and the second housing 12 form the heat dissipation channel of the temperature measurement device 1. The second elastic contact unit 156 is adjacent to the elastic body 1551. When the temperature measurement device is used, the second housing 12 is inserted into the food, and the first housing 11 is exposed to the high temperature air. The first elastic contact unit 155 transfers the heat of the first housing 11 to the part of the circuit board unit 15 inside the second housing 12, and the second elastic contact unit 156 transfers the heat to the second housing 12, as shown in FIG. 7.

As shown in FIG. 2-4, the second elastic contact unit 156 includes multiple elastic contacts 1561 arranged on both sides of the circuit board unit 15. The elastic contacts 1561 abut against an inner wall of the second housing 12, thereby restricting the movement or shaking of the circuit board unit 15.

The first elastic contact unit 155 and the second elastic contact unit 156 can be good conductors of heat such as copper sheets, which have better thermal conductivity compared to the circuit board unit 15. The second elastic contact unit 156 is located in the part of the circuit board unit 15 located inside the second housing 12, and contacts an inner wall of the second housing 12, which to some extent prevents heat from transfer to the lower part of the circuit board unit 15. Advantageously, as shown in FIG. 7, the central processing unit MCU, wireless communication unit 158, battery unit 152, and food temperature sensing unit 151 of the temperature measurement device 1 are all located below the second elastic contact unit 156 and above the tip 121.

As shown in FIG. 2-4, the insulated connection part 13 may also include a second channel 135 separated from the first channel 134, which is used to fix the first elastic contact unit 155. Specifically, the elastic body 1551 is located in the second channel 135.

As shown in FIG. 2-4, the proximal connection end 131 and the distal connection end 132 are respectively provided with grooves 136, and the grooves 136 are provided with sealing members 137. When the proximal connection end 131 and the distal connection end 132 are respectively connected to the first housing 11 and the second housing 12, the sealing members 137 respectively abut against the inner walls of a first housing 11 and the second housing 12. The setting of sealing members 137 is beneficial for waterproofing and enhances the sealing performance of the connection between the insulated connection part 13 and the first housing 11 and the second housing 12. One end of the handle 14 near the first housing 11 is provided with a first connection part 141, which is used to connect to the first housing 11. The outer periphery of the first connection part 141 is provided with a groove 136, which is equipped with a sealing member 137. When the first connection part 141 is connected to the first housing 11, the sealing member 137 contacts the inner wall of the first housing 11. The traditional temperature measurement device 1 applies glue at the connection of the components, which has the disadvantages of poor sealing, weather resistance, and easy aging. The setting of the sealing member 137 is beneficial for waterproofing and enhances the sealing of the connection between the handle 14 and the first housing 11.

As shown in FIGS. 4 and 7, the handle 14 is provided with a hollow channel 142, and the circuit board unit 15 extends into the hollow channel 142. One part of antenna unit 154 is located in hollow channel 142.

As shown in FIG. 2-4, the circuit board unit 15 is connected to environment temperature sensing unit 157. The environmental temperature sensing unit 157 is installed in the hollow channel 142. The environment temperature sensing unit 157 is used to measure the environmental temperature. When the temperature measurement device 1 is placed in an oven for use, the environment temperature sensing unit 157 is used to measure the environmental temperature in the oven. The insulated connection part 13 may also include a third channel 138 separated from the first channel 134 and the second channel 135, which is used to fix the environment temperature sensing unit 157.

Figure 6:
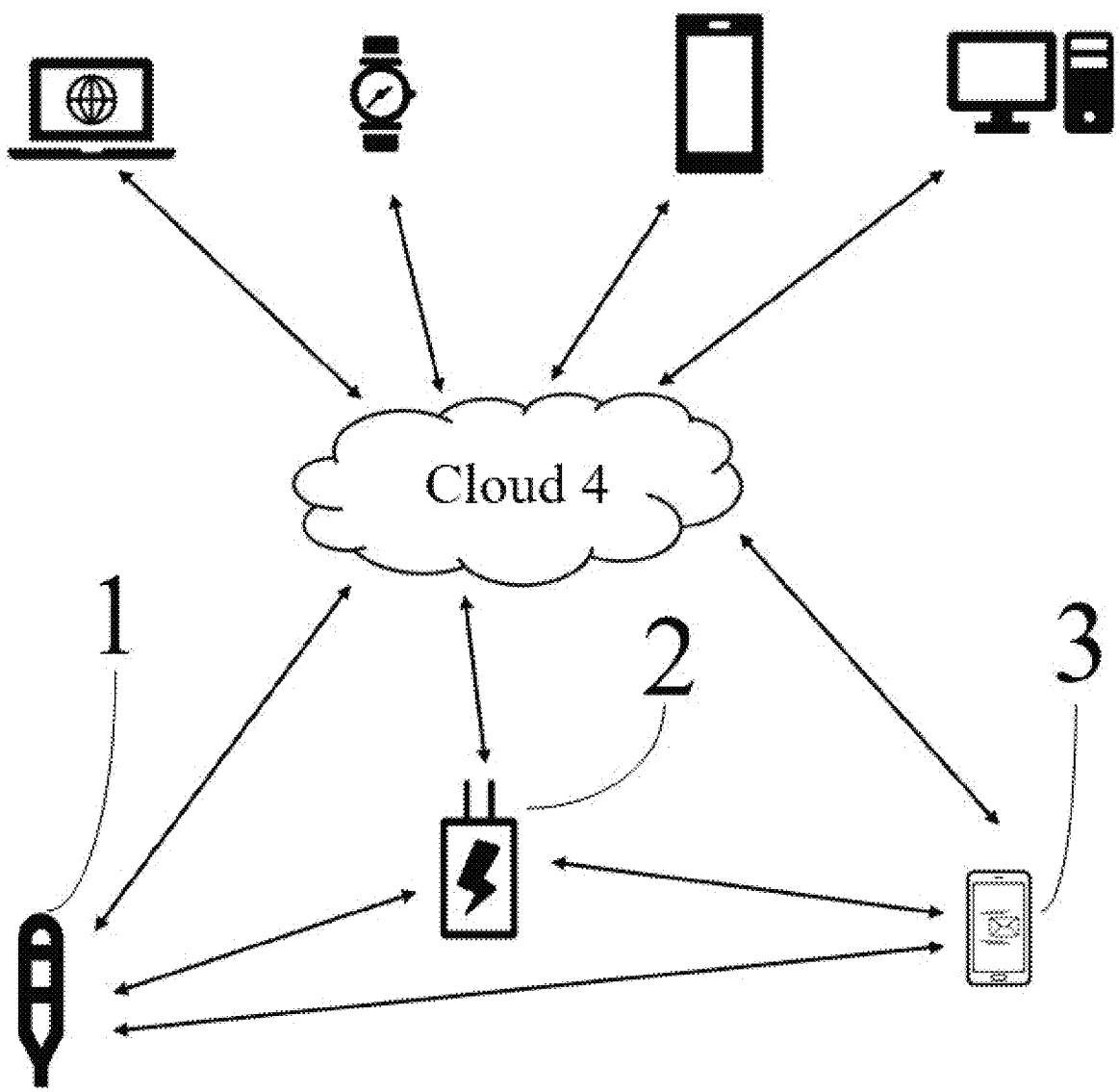
FIG. 6 shows a schematic diagram of the connection between the temperature measurement device of the present application and cloud networks and other devices.

As shown in FIGS. 6 and 7, the temperature measurement device 1 may also have a wireless communication unit 158, which is mounted on the circuit board unit 15. The wireless communication unit 158 may be one or more of Bluetooth, GSM, 3G, 4G, 2.4 GHz RF, 5.8 GHz RF, or 433 MHz RF. The wireless communication unit 158 of the temperature measurement device 1 can be connected or wirelessly communicated with the mobile device 3 or the repeater 2 specifically designed for use with the temperature measurement device, such as transmitting temperature information, remaining power, working time, etc. The mobile devices can include Internet connected smart cookware, personal computers, smart phones, smart watches or other appliances. In one embodiment, the repeater 2 can communicate with mobile devices and/or cloud network 4. Mobile device or repeater 2 can retrieve temperature information from cloud network 4. In alternative embodiments, the temperature measurement device can directly communicate wirelessly with a cloud network 4. The repeater may include a display or other device for notifying the user of the temperature detected by the temperature measurement device or temperature measurement probe. Mobile devices may include "application" or other software elements configured to display a user interface to the user. This user interface can display the corresponding temperature detected by each temperature measurement device or each temperature measuring probe. In addition, the "application" may display alerts or warnings, charging information, or cooking progress.

Calibration of the Environmental Temperature Sensing Unit

Figure 8:
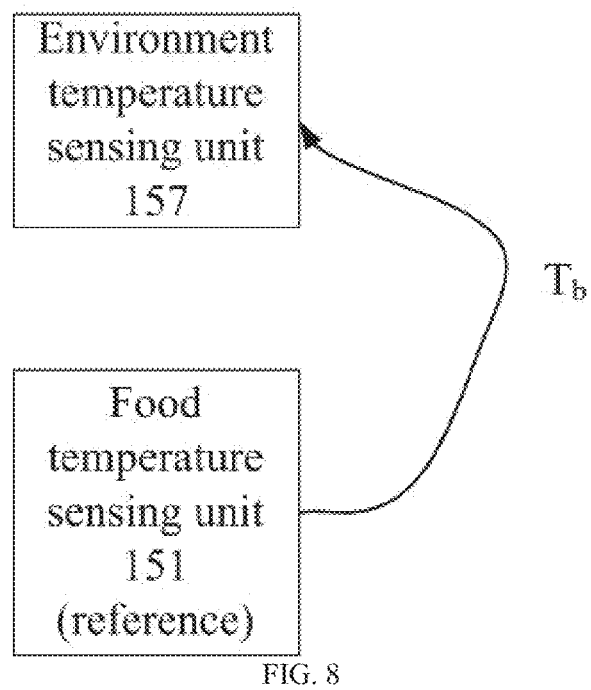
FIG. 8 shows the calibration schematic diagram of the food temperature sensing unit and the environmental temperature sensing unit of the present application.

As shown in FIG. 8, when the temperature measurement device 1 has both the food temperature sensing unit 151 and the environment temperature sensing unit 157, it is necessary to calibrate the food temperature sensing unit 151 and the environment temperature sensing unit 157. The temperature measurement range of the food temperature sensing units is relatively narrow, generally between -20 and 120° C., with high measurement accuracy, while the temperature measurement range of the environmental temperature sensing units is wide, generally between -50 and 500° C. Thus, the food temperature sensing unit can act as a reference temperature sensing unit for calibrating the environmental temperature sensing unit. Using a certain temperature value within the temperature measurement range of the food temperature sensing unit as the reference value Tb, such as 100° C., sending the reference value to the environment temperature sensing unit, and calibrating the measured temperature of the environment temperature sensing unit with the reference value Tb.

The above is only a preferred embodiment of the present application and is not intended to limit it. Any modifications, equivalent substitutions, and improvements made within the spirit and principles of the present application shall be included within the scope of protection of the present application.

What is claimed is:

1. A temperature measurement device, wherein comprising:
 a first housing;
 a second housing having a tip for insertion into food;
 an insulated connection part connected to the first housing and the second housing separately;
 a handle connected to the first housing; and
 a circuit board unit at least located inside the first housing and the second housing, wherein the circuit board unit is connected to a food temperature sensing unit, a battery unit, and an antenna unit;
 wherein, the first housing and the second housing respectively act as a first electrode unit and a second electrode unit of the temperature measurement device, and the first electrode unit and the second electrode unit are used to charge the battery unit,
 wherein the insulated connection part comprises:
 a proximal connection end;
 a distal connection end opposite to the proximal connection end; and
 a middle protrusion;
 the proximal connection end is connected to the second housing, and the distal connection end is connected to the first housing, when the first housing and the second housing are connected to the insulated connection part, the middle protrusion acts as a limiting structure for the first housing and the second housing and separates the first housing and the second housing.

2. The temperature measurement device according to claim 1, wherein when the first housing and the second housing are connected to the insulated connection part, the middle protrusion serves as a warning line for the temperature measurement device, the part of the warning line to the tip is inserted into the food, and the part of the warning line to the handle is exposed to air.

3. The temperature measurement device according to claim 1, wherein the proximal connection end comprises a fixing groove for fixing the circuit board unit.

4. The temperature measurement device according to claim 3, wherein the insulated connection part comprises a first channel for the circuit board unit to pass through.

5. The temperature measurement device according to claim 4, wherein the circuit board unit comprises a first elastic contact unit in contact with an inner wall of the first housing, and a second elastic contact unit in contact with an inner wall of the second housing, wherein the first elastic contact unit extends from the circuit board unit to the first housing, and the second elastic contact unit extends from the circuit board unit to the second housing, and the first electrode unit and the second electrode unit are respectively connected to the battery unit through the first elastic contact unit and the second elastic contact unit.

6. The temperature measurement device according to claim 5, wherein the insulated connection part comprises a second channel separated from the first channel, and the second channel is used to fix the first elastic contact unit.

7. The temperature measurement device according to claim 6, wherein the first elastic contact unit comprises an elastic body connected to the circuit board unit and a contact end in contact with the inner wall of the first housing, and the elastic body extends from the portion of the circuit board unit located inside the second housing to the inner wall of the first housing.

8. The temperature measurement device according to claim 7, wherein the second elastic contact unit is located in the portion of the circuit board unit located inside the second housing.

9. The temperature measurement device according to claim 8, wherein the first housing, the first elastic contact unit, the second elastic contact unit, and the second housing constitute a heat dissipation channel of the temperature measurement device, wherein the second elastic contact unit is adjacent to the elastic body, and when the temperature measurement device is used, the second housing is inserted into food, the first housing is exposed to air, the first elastic contact unit transfers the heat of the first housing to the part of the circuit board unit inside the second housing, and the second elastic contact unit transfers the heat to the second housing.

10. The temperature measurement device according to claim 8, wherein the second elastic contact unit comprises multiple elastic contacts arranged on both sides of the circuit board unit, and the elastic contacts are in contact with the inner wall of the second housing.

11. The temperature measurement device according to claim 1, wherein the proximal connection end and the distal connection end are respectively provided with grooves, and the grooves are provided with sealing members, when the proximal connection end and the distal connection end are respectively connected to the first housing and the second housing, the sealing members respectively abut against the inner walls of the first housing and the second housing.

12. The temperature measurement device according to claim 7, wherein one part of the elastic body is located in the second channel.

13. The temperature measurement device according to claim 11, wherein a first connection part is provided at one end of the handle near the first housing, and the first connection part is used to connect to the first housing.

14. The temperature measurement device according to claim 13, wherein a groove is provided on the outer periphery of the first connection part, and the groove is provided with a sealing member, when the first connection part is connected to the first housing, the sealing member contacts the inner wall of the first housing.

15. The temperature measurement device according to claim 13, wherein the handle is provided with a hollow channel, and the circuit board unit extends into the hollow channel, the part of the circuit board unit extending into the hollow channel is coated with a heat-resistance coating or material.

16. The temperature measurement device according to claim 15, wherein one part of the antenna unit is located in the hollow channel.

17. The temperature measurement device according to claim 16, wherein the circuit board unit is connected to an environment temperature sensing unit located in the hollow channel.

18. The temperature measurement device according to claim 1, wherein the temperature measurement device further comprises a wireless communication unit located on the circuit board unit, and the wireless communication unit communicates wirelessly with a cloud network via a mobile device or repeater.

19. The temperature measurement device according to claim 17, wherein the food temperature sensing unit serves as a reference temperature sensing unit for calibrating the environment temperature sensing unit, and the environment temperature sensing unit is calibrated based on a reference value of the reference temperature sensing unit.

* * * * *